(12) United States Patent
Olewicz (10) Patent No.: US 6,279,869 B1
(45) Date of Patent: Aug. 28, 2001

(54) PROPORTIONAL FLOW CONTROL VALVE

(76) Inventor: Tadeusz Olewicz, 1545 Smoke Hill Dr., Hoschton, GA (US) 30548

( * ) Notice: Subject to any disclaimer, the term of this patent is extended or adjusted under 35 U.S.C. 154(b) by 0 days.

(21) Appl. No.: 09/447,763

(22) Filed: Nov. 23, 1999

(51) Int. Cl.[7] .............................. F16K 7/06; F16K 31/70; F16K 31/66
(52) U.S. Cl. ........................................ 251/7; 251/9; 251/11
(58) Field of Search ........................................ 251/7, 9, 11

(56) References Cited

U.S. PATENT DOCUMENTS

| | | | |
|---|---|---|---|
| 3,680,306 | * 8/1972 | Nikitin et al. ................... | 251/11 X |
| 3,798,894 | * 3/1974 | Romanendo et al. ............ | 251/11 X |
| 3,991,972 | * 11/1976 | Eaton ................................ | 251/7 X |
| 4,219,181 | * 8/1980 | Joelson ............................. | 251/11 X |
| 4,645,489 | * 2/1987 | Krumme et al. .................. | 251/11 X |
| 4,973,024 | 11/1990 | Homma ............................ | 251/11 |
| 5,586,085 | 12/1996 | Lichte .............................. | 367/99 |
| 5,618,269 | 4/1997 | Jacobsen et al. ................. | 604/118 |
| 5,622,413 | 4/1997 | Kim et al. ........................ | 303/119.2 |
| 5,684,448 | 11/1997 | Jacobsen et al. ................. | 337/140 |
| 5,738,276 | 4/1998 | Saur ................................. | 236/92 |
| 5,819,749 | 10/1998 | Lee et al. ......................... | 128/899 |
| 5,865,418 | 2/1999 | Nakayama et al. .............. | 251/11 |
| 5,878,949 | 3/1999 | Matsui et al. .................... | 263/93 |

* cited by examiner

*Primary Examiner*—Gerald A. Michalsky
(74) *Attorney, Agent, or Firm*—Womble, Carlyle, Sandridge & Rice, PLLC (57) ABSTRACT

A proportional flow control valve having at least one pinch jaw that is movable between open and closed positions for engaging a fluid flow line passing through the valve. The valve includes a valve actuator generally formed from a shape memory alloy that engages and moves at least one movable pinch jaw. As an electrical current is applied to the shape memory alloy, the shape memory alloy exerts a moving force on the pinch jaw so as to move the pinch jaw into or out of engagement with a flow tube for controlling the opening and closing of the valve.

14 Claims, 11 Drawing Sheets

PROPORTIONAL FLOW CONTROL VALVE

FIELD OF THE INVENTION

The present invention relates to valves for controlling fluid flows. In particular, the present invention relates to a valve for proportionally controlling a fluid flow using a shape memory alloy as an actuator for opening and closing the valve.

BACKGROUND OF THE INVENTION

Valves and other types of flow control systems are commonly used in a variety of different types of applications for controlling the flow of various fluid materials through flow lines. Such different types of valves include needle valves, spool valves, butterfly and pinch valves, among others. Generally, such valves will include a body or housing through which a flow passage is defined and having a valve element mounted along the flow passage and which is movable between an open and a closed position for opening and closing the flow passage to restrict the fluid flow therethrough. For example, most pinch valves generally are mounted along a flexible flow line and include one or more movable pinch jaws that are moved or closed together to engage the flow line therebetween to pinch or shut off the fluid flow through the flow line.

In the past, most conventional valves typically have been mechanically actuated or, more recently, electromechanically actuated such as by use of a solenoid. Such solenoid actuated valves are, however, generally limited to being on/off type valves in which the valve elements are moved either to a fully open or fully closed position. In many fluid dispensing applications, such as medical or pharmaceutical applications, where control of the amount of fluid being dispensed is important and in some cases critical, however, it is desirable for the actuation of the valves to be controlled or regulated so that the valves can be closed by a desired amount to precisely and proportionally regulate the fluid flow therethrough as desired. In addition, such electromechanically actuated valves generally are relatively cumbersome and expensive and are not readily replaceable or disposable, or require their actuator, i.e., a solenoid, to first be disconnected and removed before discarding the valve assembly.

More recently, other types of actuators have been issued for controlling the actuation of flow control valves. For example, U.S. Pat. No. 4,973,024 of Homma discloses the use of a shape memory alloy (SMA) for moving a valve element between open and closed positions to open and close a valve port. Shape memory alloys generally are metal alloy wires that tend to contract in response to heating of the alloy by application of an electric current therethrough. Thereafter, as the alloys cool back to room temperature, they are easily stretched back to their normal length. The contracting force of the alloys further exerts significant pulling force and is used in Homma for moving a valve element out of engagement with a valve port to open the valve port.

One problem with such shape memory alloys is that the strength or force exerted by the alloy is dependent upon the size of the alloy wire used such that a thicker alloy wire is required for greater compressive strength. However, as the size of the alloy (i.e., the thickness of the wire) is increased, the reaction time of the alloy, and thus the timing of the opening and closing of the valve, generally decreases without application of significantly increased current, potentially impairing the performance of the valve. Thus, such shape memory alloys may not be practical for use in some applications where precise proportional control of a fluid flow is required.

Accordingly, it can be seen that a need exists for a proportional flow control valve that is able to address these and other related and unrelated problems in the art.

SUMMARY OF THE INVENTION

Briefly described, the present invention relates to a proportional flow control valve for controlling the flow of a fluid through a fluid flow line at desired levels or rates of flow. Typically, the valve will be mounted along a fluid flow line at an intermediate position therealong, and generally includes a body or housing that typically is formed from a rigid, durable material such as a plastic or metal material. The valve body or housing includes a base portion that defines an inner valve chamber, and an upper plate or cover that is mounted over the base for enclosing the valve chamber.

A flow passage is defined through the valve body, through which a flexible flow tube is received. Typically, the flow tube will be formed from a flexible plastic material or similar compressible, resilient material and includes a coupling or connector at each end for connection to the fluid flow line. The fluid is received and flows through the flow tube, which is typically compressed or squeezed within the valve as necessary to restrict or control the fluid flow therethrough. In addition, the flow line itself can be formed from a flexible, compressible tubing material that is extended through the valve passage without requiring the use of a flexible flow tube.

The valve further includes a valve assembly mounted within the chamber of the valve body and including one or more valve elements that engage and pinch or squeeze the flow line to restrict and control the fluid flow therethrough. In a first embodiment of the valve, the valve elements generally include pinch jaws mounted along the flow tube. The pinch jaws generally include a first, active jaw that is movable toward and away from the flow tube, between an open and closed position, and a second, stationary pinch jaw. As the active pinch jaw is moved toward its closed position, the flow tube is engaged and compressed between the pinch jaws to restrict the fluid flow. A biasing element is attached to the active pinch jaw for biasing the active pinch jaw to a normally open or closed rest position depending upon the biasing for the particular application in which the valve is being used.

A valve actuator is mounted within the valve body for moving the valve elements into engagement with the flow tube/flow line. The valve actuator comprises a shape memory alloy typically in the form of a wire or flat strip. The shape memory alloy is connected to a power supply that supplies an electric current to heat the shape memory alloy. In response, the shape memory alloy contracts, exerting a moving or pulling force against the active jaw for moving the active jaw between its open and closed positions. As the flow of current is halted and the shape memory alloy cools, the biasing element biases the active jaw back to its original rest position. A pulley system is mounted within the valve chamber and includes a series of pulley members about which the shape memory alloy is extended so as to increase the strength/moving force applied to the active pinch jaw by the shape memory alloy by between typically 2:1 up to 4:1 or greater. This enables the shape memory alloy wire to be of reduced dimensions with increased or enhanced strength and reaction times.

In an additional embodiment of the valve, the stationary pinch jaw of the first embodiment is replaced with a removable jaw received within a longitudinally extending channel within the valve body. The removable jaw has a substantially rectangularly shaped body including an upper portion having a bearing surface against which the flow tube is compressed, and resilient leg members that project downwardly. Locking tabs are formed along the leg members, projecting outwardly and engage corresponding locking recesses formed in the body of the valve. The tabs are held in locking engagement with the recesses by the resilient leg members bearing against the valve body to lock the removable jaw plate in a fixed position within the valve body.

In use, the leg members are urged inwardly to release the locking tabs from the locking recesses and enable the jaw plate to be removed from the valve body. Thereafter, the valve body is fitted over the flow line, with the flow line received within the flow passage. The removable jaw is then reinserted into the valve body and is moved into engagement with the flow tube, with its locking tabs being engaged within the locking recesses of the valve body.

In a third embodiment of the valve, the valve body is formed with an internally mounted flow tube that defines a flow passage and includes connectors at each end for connecting the valve to the flow line. In this embodiment, the valve elements include a movable pivot arm having a pinch roller mounted thereto, and a stationary support or bearing plate below the flow tube. The pivot arm is connected at one end to a biasing element, generally a compression or tension spring, which biases the pinch arm toward a normally open or normally closed position. The valve actuator comprises a shape memory alloy extended about a pulley system mounted within the valve body and connected to a power source which communicates with the ends of the shape memory alloy for supplying an electrical current thereto. In response, the shape memory alloy contracts so as to exert a moving/pulling force on the second end of the pivot arm to cause the pinch roller to either engage the flow tube between the pinch roller and bearing plate, or be moved away from the bearing plate to allow the flow tube to decompress, for resisting or opening the flow tube to control the fluid flow therethrough as desired.

In an additional embodiment of the valve, the support or bearing plate of the third embodiment can be replaced with a second pivotable pinch arm. In such an embodiment, the opposed pinch arms typically each include a first end at which a pinch roller is mounted, a second end connected to the biasing element and having a pulley member attached thereto, and about which the shape memory alloy is extended, and a pivot pin mounted at an intermediate portion along the length of the pinch arm and about which the pinch arms are pivoted toward and away from engaging, contact with the flow tube upon actuation of the shape memory alloy.

In a further embodiment of the valve, the valve body is formed from a pair of opposed clamping arms that are pivotally mounted about a common pivot pin. Each clamping arm generally includes a first or proximal end and a second or distal end, with the proximal ends of each arm biased together by a biasing element such as a main spring. A recess is formed within each of the clamping arms adjacent their first or proximal ends, so as to define a passage through which the flow line is received. Pinch jaws are mounted to each of the clamping arms adjacent their proximal ends, and are movable into the flow passage. A shape memory alloy is extended about a pulley system mounted within each of the clamping arms and each pinch jaw. As current is applied through the shape memory alloy, the shape memory alloy contracts and urges the pinch jaws toward a closed position with the flow line engaged therebetween for restricting the flow of fluid through the flow line.

The valves of the above discussed embodiments can be connected to external or internal power supplies for supplying an electrical current to the shape memory alloy. In addition, a feedback control can be used in conjunction with the valve for proportionally controlling the opening and closing of the valves to achieve a desired rate of flow therethrough. This feedback control can include a potentiometer mounted along the flow line for detecting the amount of opening of the valve, in response to which manual adjustments of the current applied through the shape memory alloy can be made to adjust the opening/closing of the valve. In addition, the valve can be linked with a programmable controller which measures internal resistance of the shape memory alloy, or can include an internal sensor within the valve that measures the position of the pinch jaw(s) or external feedback sensors, such as a flow-meter, that measure the amount of flow through the flow line in response to which the controller will adjust the current applied to the shape memory alloy to adjust the opening/closing of the valve to achieve a desired rate of flow.

Various objects, features and advantages of the present invention will become apparent to those skilled in the art upon reading the following detailed description when taken in conjunction with the accompanying drawings.

DETAILED DESCRIPTION OF THE PREFERRED EMBODIMENTS

Figure 1:
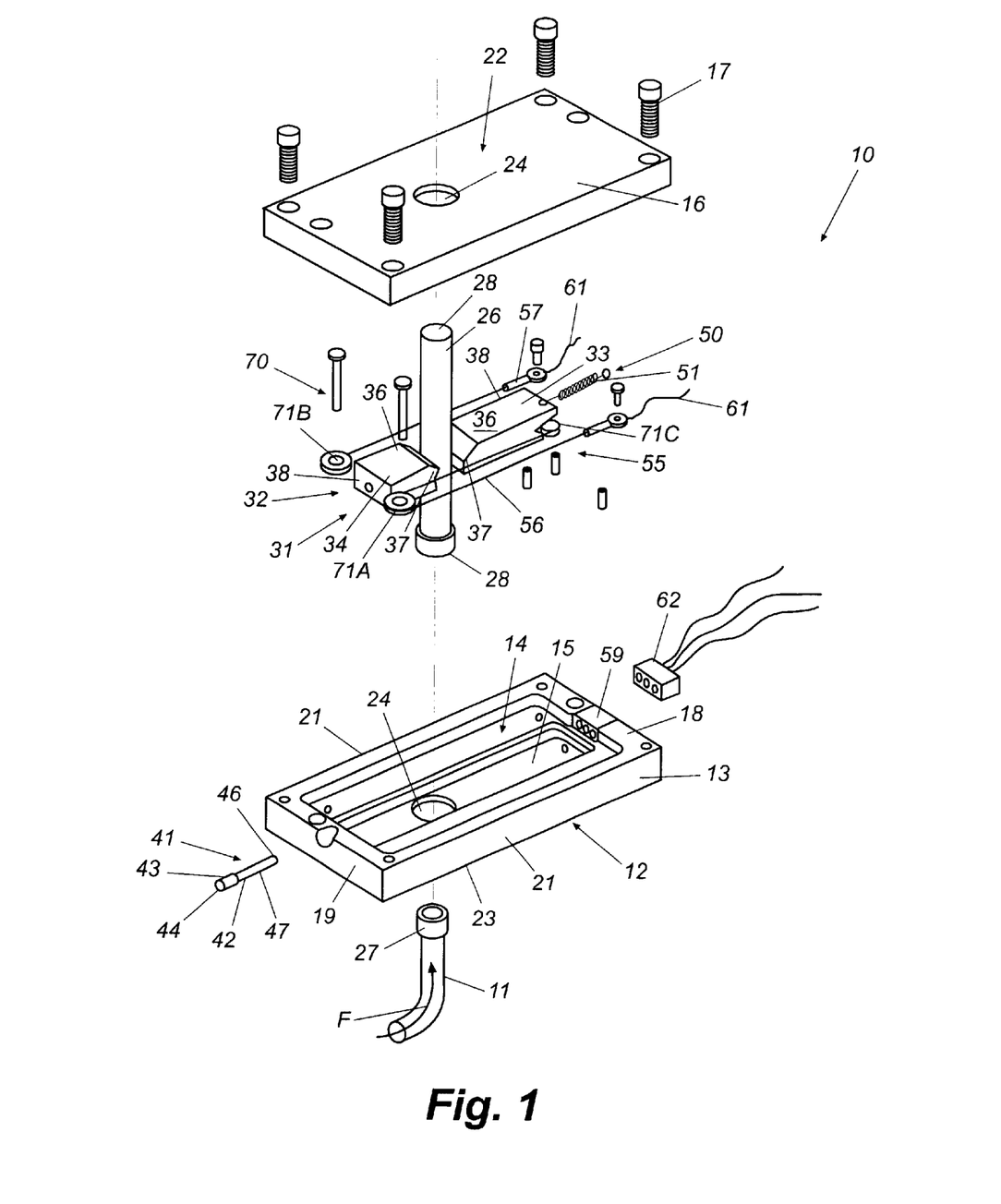
FIG. 1 is an exploded perspective view of a first embodiment of the proportional flow control valve of the present invention.

Referring now in greater detail to the drawings in which like numerals indicate like parts throughout the several views, FIG. 1 illustrates a first embodiment of a proportional flow control valve 10 according to the present invention. The valve 10 generally is mounted along a fluid flow line 11 through which a fluid medium flows as indicated by arrows F, such as, for example, an IV drip in a medical application, with the rate of flow of the fluid being controlled by the valve 10. Typically, the flow line 11 will be formed from a flexible, compressible material such as plastic tubing of varying elasticities depending upon the application. The valve 10 is actuated to restrict or open the flow of fluid through the flow line, as needed to achieve a desired rate of flow.

The valve 10 includes a valve body or housing 12 typically formed from a hard plastic or similar durable material. The valve body 12 includes a base 13 defining a substantially valve chamber 14 having a longitudinally extending groove or slot 15 formed therein and an upper or cover plate 16 that is fitted over and secured to the base 13 by a series of fasteners 17 such as screws, rivets or other types of fastening devices, such as adhesives, etc. The valve body includes first and second ends 18 and 19, sides 21 and front and rear portions 22 and 23. A flow passage or opening 24 is defined through the cover plate 16 and base 13, extending through the front and rear surfaces 22 and 23 and valve chamber 14.

As FIG. 1 illustrates, a flow tube 26 is extended through the flow passage 24, projecting outwardly from both the front and rear surfaces of the valve body. The flow tube 26 generally is formed from a flexible, compressible material, typically a plastic tubing or similar material, and includes connectors 27 (only one of which is shown) or couplings at each end 28 and 28' thereof. The connectors 27 generally are quick connect/disconnect connectors that attach the flow tube to the flow line 11 as indicated in FIG. 1. Thus, for installation of the valve 10 along a flow line, the valve can be mounted in a desired position within a gap in the flow line, with the flow tube connected to the spaced sections of the flow line using the connectors. This also allows for easy disconnection and disposal of the valve as a unit, if desired. In addition, it will be understood that it will also be possible to simply thread the flow line itself through the flow passage instead of using a separate flow tube.

Figure 2:
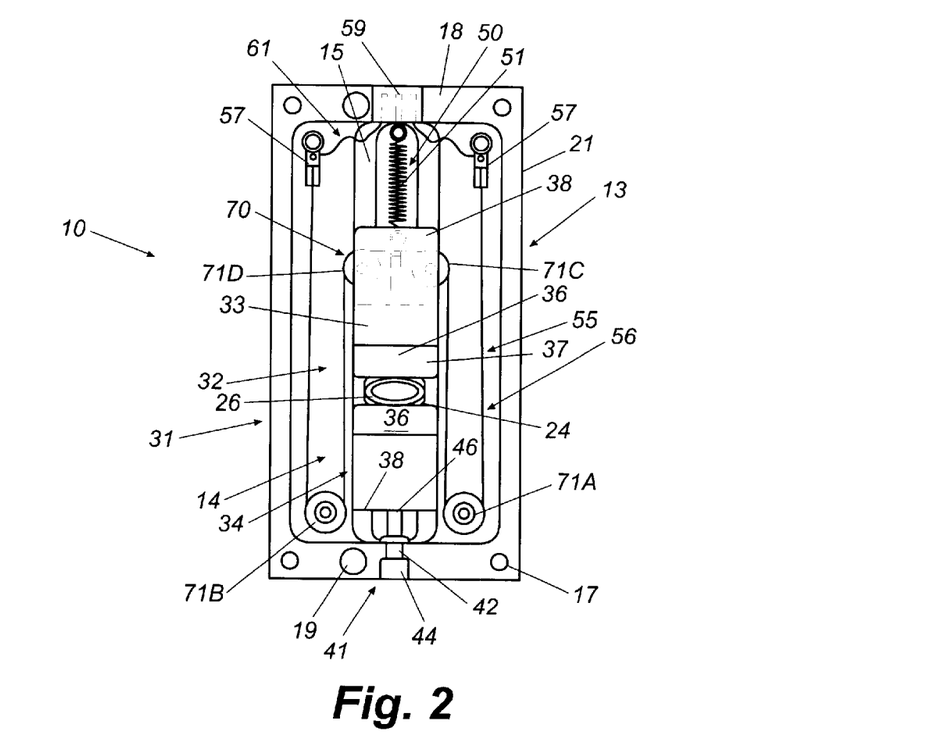
FIG. 2 is a plan view of the valve of FIG. 1.

As illustrated in FIGS. 1 and 2, the valve 10 further includes a valve assembly 31 mounted within the valve chamber 14 and including a series of valve elements 32. In a first embodiment of the flow valve 10, the valve elements 32 generally include a pair of pinch jaws 33 and 34 mounted on opposite sides of the flow tube in an opposed relationship. Each of the pinch jaws 33 and 34 is a substantially rectangularly shaped member sized and shaped to fit within the groove or slot 15 formed along the valve chamber 14. Each of the pinch jaws further includes a proximal end 36 having a sloped or beveled bearing surface 37, and a distal end 38 spaced therefrom.

A first one of the pinch jaws 33 is an active pinch jaw movable toward and away from the opposed, second pinch jaw 34. The active pinch jaw 33 is received and guided along the slot 15 of valve chamber 14 so as to be movable between a nonengaging, open position and an engaging, closed position wherein the flow tube/flow line is compressed between the pinch jaws 33 and 34 to restrict the fluid flow therethrough. The opposed or second pinch jaw 34 is a stationary pinch jaw typically mounted in a desired set position.

An adjustment mechanism 41, here illustrated as an adjustment screw or bolt 42 (FIG. 1) is received through the second end of the valve body and distal end 38 of pinch jaw 34. The adjustment screw 42 includes a first end 43 positioned externally of the valve body and having a head portion 44 that can either be manually engaged or which can include a recess for an adjustment tool such as a screwdriver or wrench, and a second end 46 attached to the distal end of pinch jaw 34. The adjustment screw further includes a helical thread 47 that engages the valve body. To adjust the position of the stationary pinch jaw 34, the adjustment screw is rotated clockwise or counterclockwise to move the stationary pinch jaw toward or away from the upper pinch jaw to ensure complete closure and sealing of the flow tube/flow line as the flow tube is engaged therebetween upon actuation of the valve.

As indicated in FIG. 2, a biasing element 50 is mounted to the distal end 38 of the active pinch jaw 33 and further connects to the valve body adjacent its first end 18. The biasing element typically is a spring as indicated by 51, or other, similar type of biasing element, for urging or pulling the active pinch jaw 33 toward or away from the stationary pinch jaw 34. Typically, the spring 51 will be either a compression spring or tension spring depending upon the application for the flow valve 10 and whether it is desired for the active pinch jaw to be in a normally open rest position out of engagement with the flow tube or a normally closed rest position, engaging the flow tube and restricting the fluid flow therethrough.

As illustrated in FIGS. 1 and 2, a valve actuator 55 is mounted within the valve chamber 14 for engaging and moving the active pinch jaw 33 into or out of engagement with the flow tube so as to compress or allow the flow tube to be decompressed to control the flow of fluid F (FIG. 1) therethrough as the valve is opened and closed. The valve actuator comprises a shape memory alloy 56 that generally is formed as a wire, or also can be formed as a flat strip extended in a substantially serpentine path about the valve chamber and attached at its opposite ends to ring connectors 57.

The shape memory alloy ("SMA") of the activator generally is a nickel titanium metal alloy such as "Flexinol™", manufactured by Dynalloy, Inc. The SMA can be of a variety of diameters and lengths, generally selected according to the particular application for the valve 10, based upon extent of control and reaction times required. Typically, the SMA will retract between approximately 3% to 7% of its length upon being heated to its cycle temperature of between 60° C.–110° C. upon application of electric current thereto.

Figure 3:
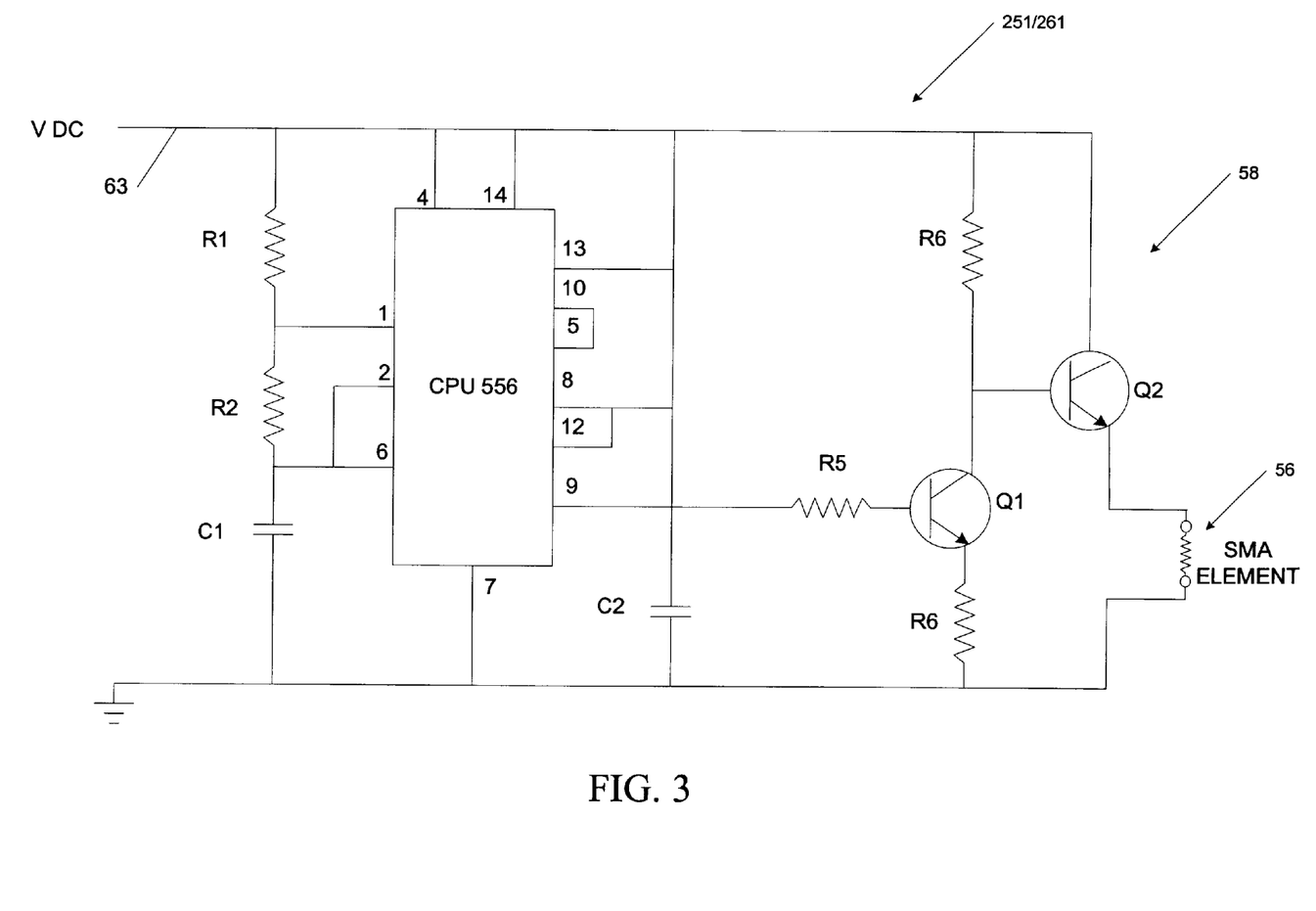
FIG. 3 is a schematic illustration of a driver circuit for actuating the shape memory alloy for the proportional flow control valve of the present invention.

The current required to raise the SMA to its desired cycle temperatures generally varies with the thickness of the SMA such that the thicker the SMA wire or strip, the greater the current required to raise the SMA to its required cycle temperature to cause the SMA to contract. In general, the SMA is heated to its cycle temperature by resistance heating through the use of an electrical current flow such as through alternating current (AC), direct current (DC) or, preferably through pulse width modulation (PWM) through which current flow is applied in the form of pulses of a certain amplitude. Such pulses can be varied in frequency and pulse width or duration to control the heating of the SMA. An example of a driver circuit 58 for controlling the current flow to the SMA 56 is illustrated in FIG. 3.

The power requirements for the SMA generally are fairly low with the resistance of the SMA varying according to the wire diameter and length. For example, a 0.006 diameter SMA wire generally has a resistance of 1.25 ohms/inch, such that if a 7 inch length wire is used, the total resistance will be equal to approximately 8.75 ohms. In addition, the strength of the SMA and thus the pulling or moving force exerted by the SMA upon contraction varies with the diameter and approximate stroke, i.e., amount of contraction, of the particular SMA wire used. For example, for an SMA wire having an approximately 3% by length stroke, the available force typically exerted will vary from approximately 7 grams to 930 grams for wires of varying diameters of 0.001 inch to up to 0.010 inch. Larger size SMA wires, i.e., upwards of 0.015–0.025 inches or greater, exert even greater forces. However, as the diameter of the SMA wire is increased, the amount of current required to heat the SMA wire to its desired cycle temperature within a desired time also increases.

As illustrated in FIGS. 1 and 2, the ring connectors 57 are attached to each end of the SMA 56 and are connected to a plug-in connector 59 by leads or wires 61. The plug-in connector 59 generally is mounted in one of the end walls, such as first end 18, of the valve body 12 and generally includes a series of internal electrical contacts (not shown). A mating connector 62 is received and plugs into the plug-in connector 59 for connecting the plug-in connector, and thus the SMA, to a current source 63 via driver circuit 58.

As current is applied to the SMA through the driver circuit, the SMA is heated to its cycle temperature, whereupon the SMA is caused to contract by approximately 3% to 7% of its length. This contraction causes a pulling or moving force to be exerted upon the movable pinch jaw 33 (FIGS. 1 and 2) so as to cause the movable pinch jaw to be moved in the direction of arrows 64 toward engagement with the flow tube 26. The flow tube accordingly is compressed between the active and stationary pinch jaws 33 and 34 to restrict the fluid flow F (FIG. 1) through the flow line to a desired level, including completely shutting off the fluid flow through the valve, or is permitted to expand and open, based upon the operation of the valve. Once the flow of current to the SMA has ceased, the SMA cools back to room temperature. As the SMA cools to room temperature, the biasing force exerted by the biasing element 50, such as spring 51, tends to pull or urge the active pinch jaw back to its normal rest position, i.e., either fully open or closed, which in turn causes the SMA to be stretched substantially back to its original length.

Figure 4:
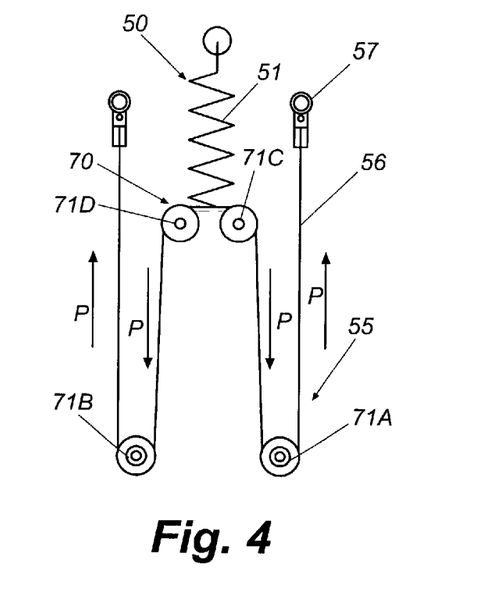
FIG. 4 is a schematic illustration of the pulley system and biasing element of the valve of FIG. 1.

As shown in FIGS. 1, 2 and 4, a pulley system 70 is mounted within the valve chamber 14 (FIGS. 1 and 2) about which the SMA wire 56 is extended. The pulley system includes a series of pulley members 71A–71D (FIGS. 2 and 4) that are mounted at spaced positions within the valve chamber. Two of the pulley members 71B and 71C are mounted to the active pinch jaw so as to be movable therewith. As indicated in FIG. 4, the SMA wire 56 is extended about the pulley members 71A–D in a substantially serpentine path.

The pulley system enhances or increases the pulling force of the SMA by approximately 4:1, as indicated by arrows P. Thus, for example, if a 0.006 inch diameter SMA wire is used, having a normal biased spring available force of approximately 330 grams, the resultant pulling force P applied to the pinch jaw to pinch the flow tube closed will be increased by approximately 4 times, up to approximately 1320 grams. This enhanced pulling force can be varied through the use of greater or fewer pulleys. The use of the pulley system thus enables SMA wires of reduced diameters to be used while increasing the strength or moving/pulling force capable of being applied by such SMA wires to be significantly increased or enhanced to enable enhanced reaction times of the SMA element with lower application currents being required.

Figures 5A, 5B:
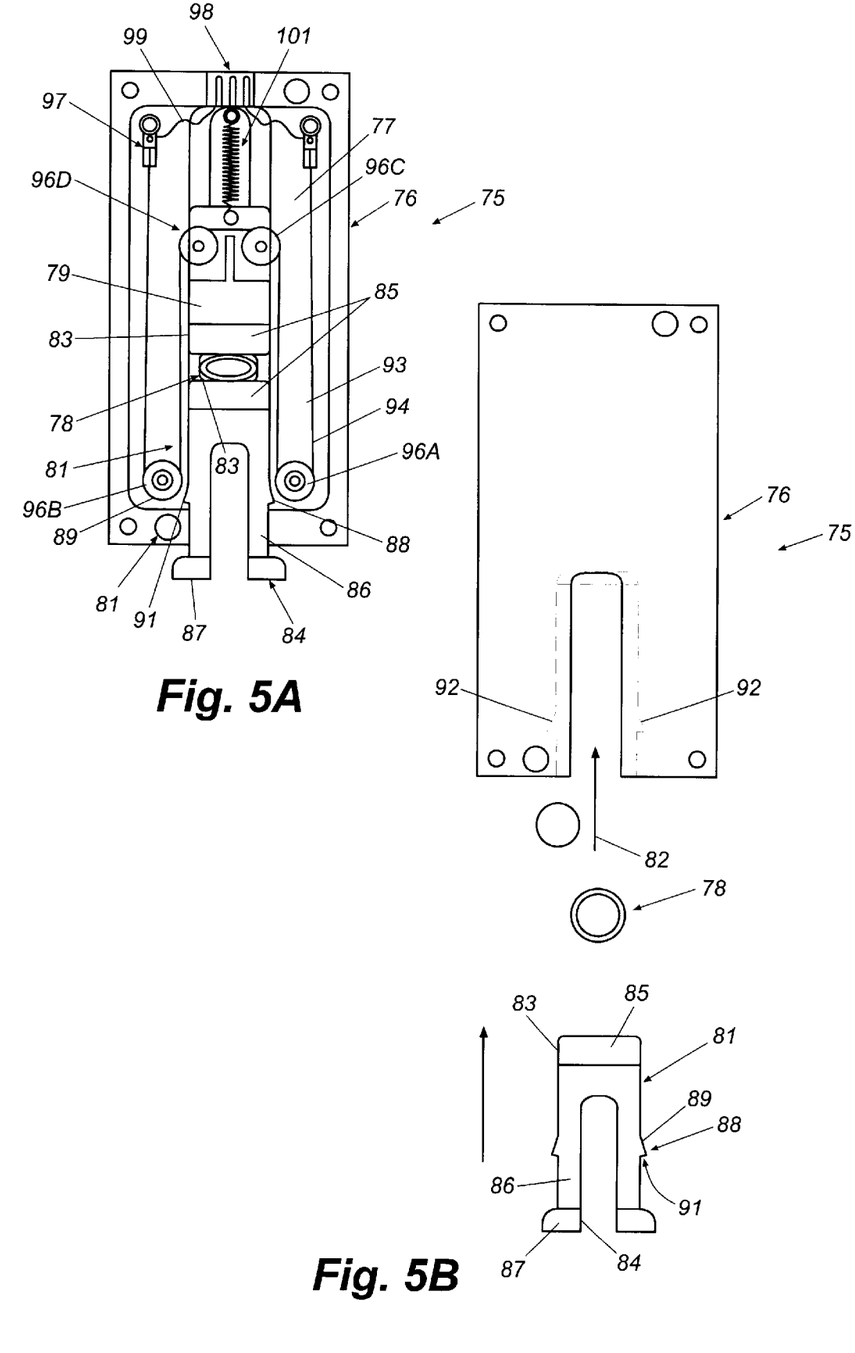
FIG. 5A is a plan view of a second embodiment of the proportional flow control valve of the present invention.
FIG. 5B is a plan view of the valve of FIG. 5A, schematically illustrating the removable jaw.

FIGS. 5A and 5B illustrate an alternative embodiment 75 of the flow control valve that is similar in structure and operation to the first embodiment of the flow control valve 10 illustrated above. In this embodiment, the flow control valve 75 includes a valve body 76 defining an internal valve chamber 77, and through which a valve tube 78 is extended. A first or active pinch jaw 79 is received within and is movable longitudinally along the valve chamber 77 as shown in FIG. 5A. A removable, second pinch jaw 81 is received within the valve chamber as a fixed position opposed from the active pinch jaw 79.

As illustrated in FIGS. 5A and 5B, an open ended channel 82 or recess is formed in the valve body 76 extending from a first end 83 of the valve body longitudinally to a immediate point indicated at 84 along the valve body and receives the removable pinch jaw therein. The removable pinch jaw 81 generally is formed from a resilient, durable material and includes a upper bearing surface or edge 85 against which the flow tube 78 is received and supported, and a pair of resilient leg members 86 that extend away from the upper bearing surface 85. Each of the leg members 86 includes a horizontally projecting tab or protrusion 87 that engages the first end 83 of the valve body and prevents further movement of the removable pinch jaw into the valve body. Locking teeth 88 are formed along each of the leg members 86, each having a sloped upper surface 89 to enable the leg members to be guided into the channel 82, and substantially flat locking surface 91. The locking teeth are received within an engaged recessed locking recesses 92, indicated in dashed lines in FIG. 5B, for locking the removable pinch jaw 81 and its fixed position within the valve body.

This embodiment of the flow control valve 75 thus enables the removal of removable pinch jaw 81 to allow the valve 75 to be fitted over a flow line or flow tube with the flow tube being received within the channel 82 and then secured with the replacement of the removable pinch jaw 81. This enables the quick connect and disconnect of the flow control valve 75 from an existing flow line without requiring the flow tube/flow line to be cut or physically threaded through the center of the valve.

As shown in FIG. 5A, the flow control valve 75 includes a valve actuator 93, that comprises a SMA wire 94. The SMA wire is extended in a substantially serpentine path around a series of pulley members 96A–D and is connected at its ends to ring connectors 97. The ring connectors are linked to a plug in connector 98 by wires 99 for supplying a flow of current to the SMA wire for the actuation/deactuation of the valve 75. As with the previous embodiment discussed above, when the current is applied to the SMA wire, it is contracted causing the active pinch jaw 79 to be pulled or urged toward or away from the flow tube 78, depending upon the particular method operation of the valve, for restricting or opening up the flow of fluid through the flow tube as needed.

A biasing element 101 such as a tension spring or compression spring is mounted to the rear of the active pinch jaw and pulls or urges the active pinch jaw toward its normal rest position, either in compressive engagement with the flow tube or in a nonengaging, open position depending upon the desired operation of the valve.

A third alternative embodiment of the flow control valve 110 is illustrated in FIGS. 6A–6B and 7A–7B, which illustrate different, alternative operative states of the valve 110 showing the valve in a normally open, nonactuated rest position and alternatively in a normally closed, nonactuated rest position.

The flow control valve 110 includes a valve body 111 having sidewalls 112, 113 and first and second end walls 114, 116 that define an internal valve chamber 117. A flexible flow tube 118 is extended longitudinally through the valve chamber 117 and is attached at its opposite ends 119 and 121 to quick connect/disconnect fittings or couplings 122 mounted within the end walls 114 and 116 of the valve body 111. The couplings 122 enable the quick connect/disconnect of the flow tube 118 of the flow control valve 110, to a flow line.

Figure 6A:
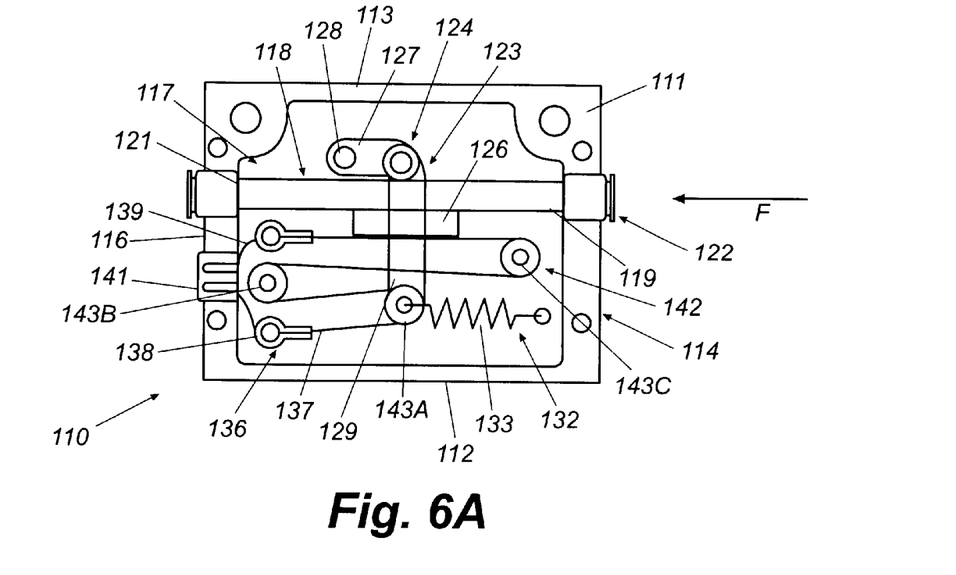
FIGS. 6A and 6B are side elevational views of a third embodiment of the proportional flow control valve of the present invention, shown in normally open, nonactuated and partially actuated condition.
Figure 6B:
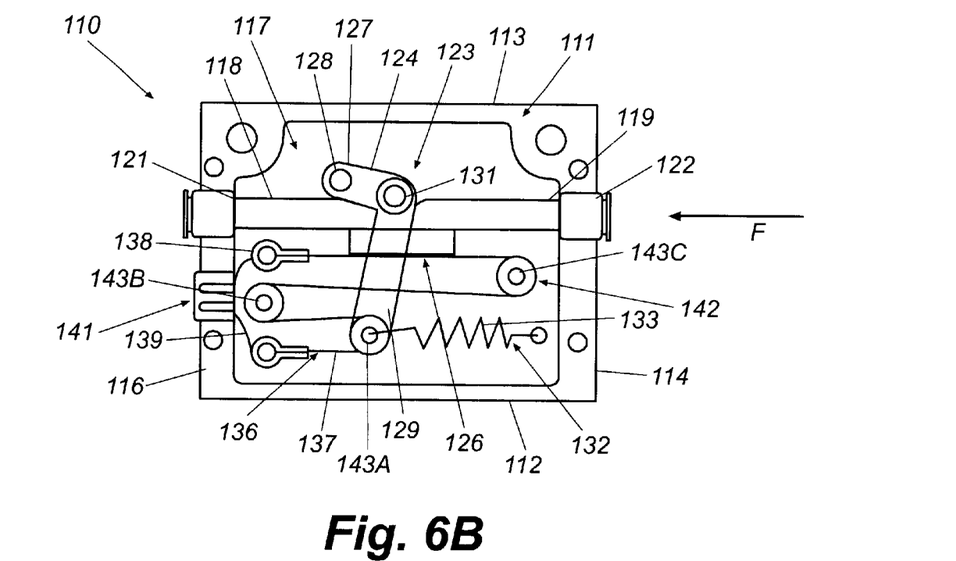

A valve element 123 is mounted within the valve chamber 117 adjacent to flow tube 118 for engaging or pinching the flow tube for restricting the flow of fluid F therethrough. In this embodiment, the valve element includes a pivoting pinch arm 124 and a tube support plate 126 on which the flow tube is supported and engaged by the pinch arm 124. As shown in FIGS. 6A–7B, the pinch arm 124 generally is substantially L-shaped and includes an upper, first end 127 that is pivotally mounted to the valve body by a pivot pin 128 and a second or lower end 129 that projects below the tube support plate 126. A pinch roller 131 is mounted at an intermediate point about the pinch arm 124, extending laterally across the valve chamber 117. The pinch roller is moved into pinching or compressive engagement with the flow tube 118 as illustrated in FIGS. 6B and 7A.

A biasing element 132 is mounted within the valve body and connects to the lower or second end 129 of pinch arm 124. For uses of the flow control valve 110 in which the pinch arm is in a normally nonactuated, open configuration when in its rest position, as illustrated FIG. 6A, the biasing element typically comprises a tension spring 133 that is attached to the first end 114 of the valve body and tends to pull or urge the second end of the pivot arm toward the first end of the valve body, against the flow of fluid F so as to bias the pivot arm into the normally open, nonactuated rest position shown in FIG. 6A.

Figure 7A:
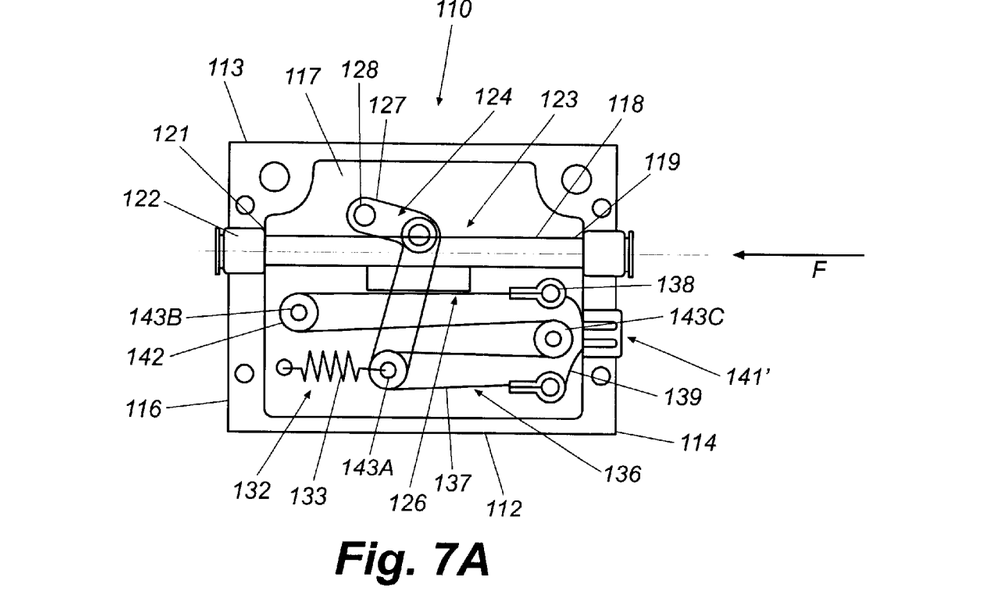
FIGS. 7A and 7B illustrate an alternative embodiment to the embodiment of the proportional flow control valve of FIGS. 6A and 6B showing the valve in a normally closed, nonactuated and an opened, actuated condition.
Figure 7B:
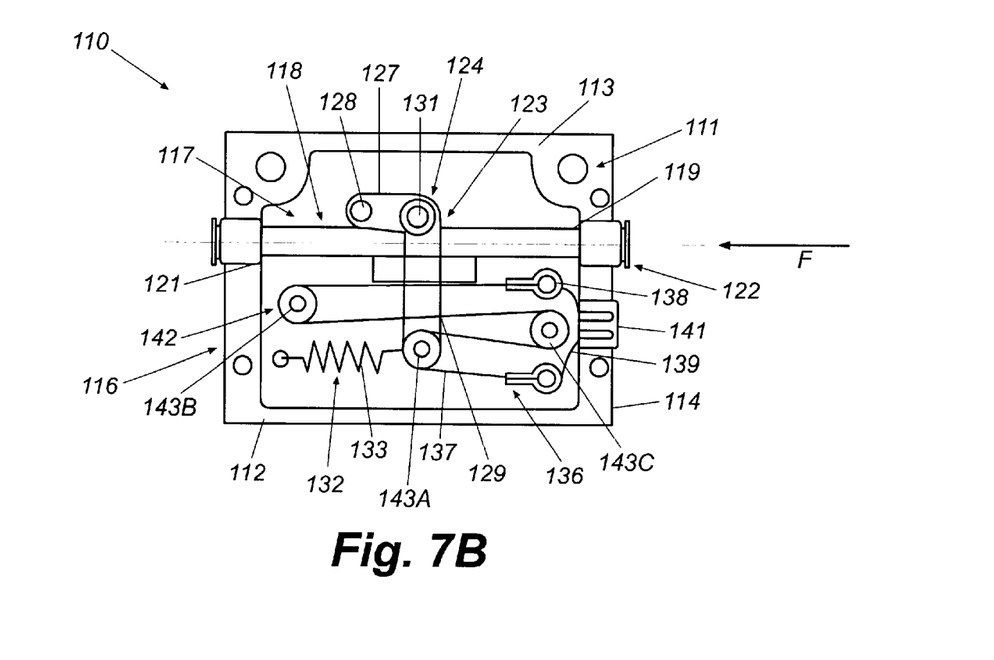

For uses or operations of the flow control valve 110 in which it is necessary or desired for the flow control valve to be in a normally closed, nonactuated configuration, as shown in FIG. 7A, the position of the biasing element 132 within the valve chamber generally will be reversed, with the tension spring being positioned in front of the pivot arm and mounted to the second or downstream wall 116 of the valve body as shown in FIGS. 7A and 7B. As a result, when valve is in its nonactuated state, the tension spring 133 tends to pull the second end 129 of the pinch arm toward the second end 116 of the valve body, causing the pinch roller 131 to be pivoted downwardly into the compressive engagement with the flow tube as shown in FIG. 7A.

The flow control valve 110 further includes a valve actuator 136 generally comprises an SMA wire 137 having ring connectors 138 mounted to each of its ends. The ring connectors are connected via wires 139 to a plug-in connector 141 that connects the flow control valve to a power supply (not shown) for supplying a flow of current to the SMA wire 137 upon actuation of the flow control valve.

A pulley system 142 is mounted within the lower portion of the value chamber 117, and generally includes a series of three pulley members 143A–143C mounted at spaced locations about the valve chamber, including one of the pulley members 143A being mounted to the second end 129 of the pinch arm 124. The SMA wire 137 is extended about the pulley members 143A–143C in a substantially serpentine path for enhancing the pulling force that is able to be exerted by the SMA wire for moving the pinch arm 124 between its open and closed positions for controlling the flow of fluid F through the flow tube 118.

Figure 8:
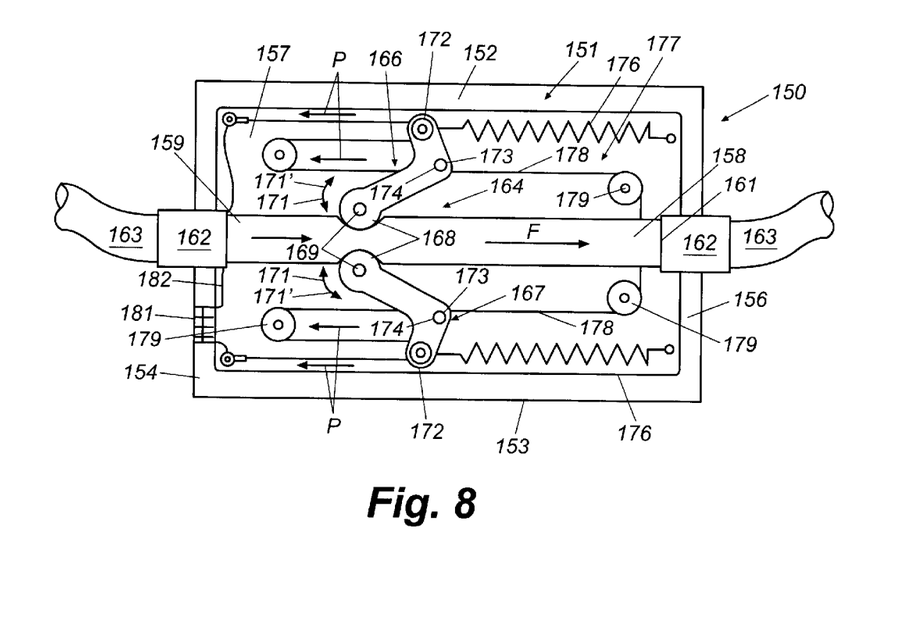
FIG. 8 is a side elevational view of a further embodiment of the proportional flow control valve of the present invention.

FIG. 8 illustrates still a further alternate embodiment of the flow control valve, indicated by 150. In this embodiment, the flow control valve 150 includes a valve body 151 having sides 152 and 153 and upstream and downstream end walls 154 and 156 that define a valve chamber 157 within the body 151. A flexible flow tube 158 is extended through the valve chamber 157 for transport of the fluid flow F through the valve body 151 of the valve 150. The flow tube is attached at its opposite ends 159 and 161 to quick connect/disconnect couplings or fittings 162 for connection of the flow tube to a flow line 163.

In this embodiment of the flow control valve 150, valve elements 164 that generally comprise a pair of pivoting pinch arms 166 and 167 are mounted on opposite sides of the flow tube 158. Each of the pinch arms 166 and 167 has a generally L-shaped configuration including a first end 168 to which a pinch roller 169 is mounted. The pinch roller engages and pinches the flow tube therebetween as shown in FIG. 8 as the pinch rollers are pivoted toward the flow tube in the direction of arrows 171 to pinch or compress the flow tube to restrict the fluid flow therethrough. The pinch arms further include a second end 172 and a pivot point 173 between the first and second ends at which the pinch arms are pivotally mounted to the valve body by pivot pins 174.

Biasing elements such as tension springs 176 are attached to the second or downstream end wall 156 of the valve body 151 and to the second ends 172 of the pinch arms 166 and 167. The tension springs tend to urge or pull the second ends 172 of the pinch arms towards the downstream end wall 156 of the valve body. This causes the pinch arms to be pivoted about their pivot points 173 so as to move their pinch rollers away from engagement with the flow tube and then to a nonactuated, nonengaging rest position.

The valve 150 further includes a valve actuator 177 that generally comprises an SMA wire 178. The SMA wire is extended about a substantially serpentine path within the valve chamber 157 about a series of pulley members 179. The SMA wire is connected to a plug-in connector 181 mounted to end wall 154 of the valve body 151 by wires 182, for connecting the valve to a power supply (not shown).

As electrical current is supplied through the plug-in connector to the SMA wire, the SMA wire is caused to contract. As the SMA wire contracts, it exerts a pulling force P on the second ends 172 of the pinch arms 166 and 167, causing the pinch rollers mounted to the first ends of the pinch arms to be pivoted in the direction of 171 into compressive engagement with the flow tube so that the flow tube is pinched or squeezed therebetween as indicated in FIG. 8. The extension of the SMA wire about the pulley members further enhances the pulling force P exerted by the SMA wire by approximately a 2:1 to 4:1 ratio to enable smaller diameter wires to be used while enabling enhanced pulling forces to be applied for closing of the valve and restricting the flow of fluid F therethrough. As with the previous embodiments, the configuration of the SMA wire and positions of the tension springs can be re-oriented so that the pinch arms are automatically biased toward a normally closed position.

Figure 9A:
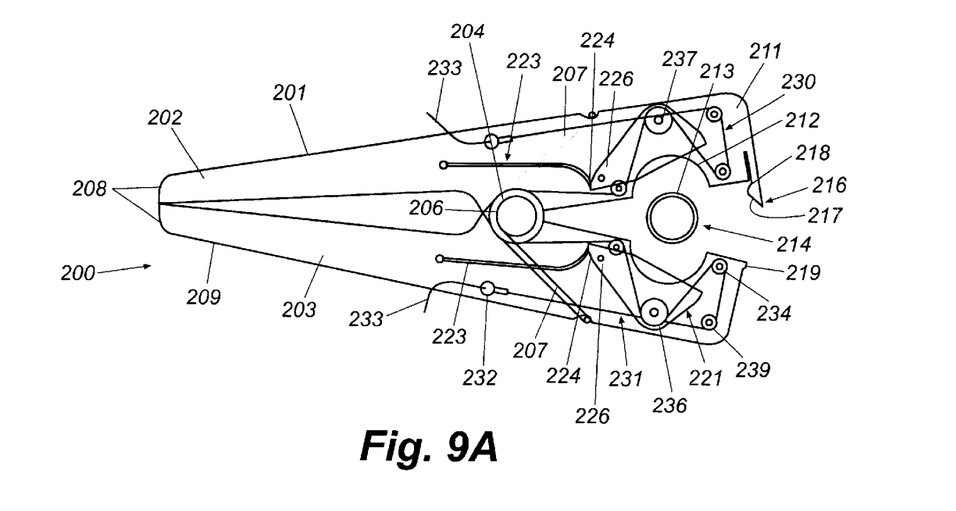
FIGS. 9A–9C are side elevational views illustrating still a further embodiment of the proportional flow control valve of the present invention and in disengaged, nonactuated, and actuated positions.
Figure 9B:
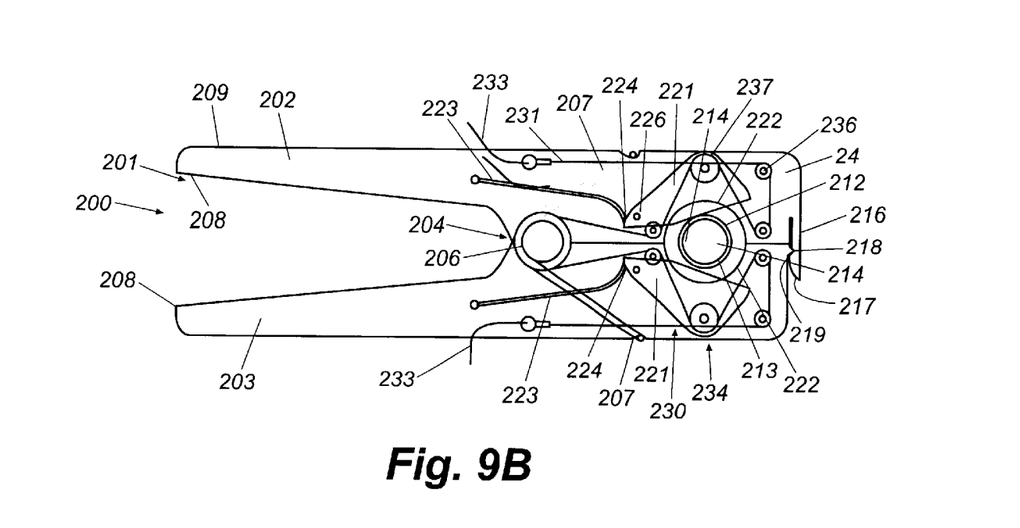
Figure 9C:
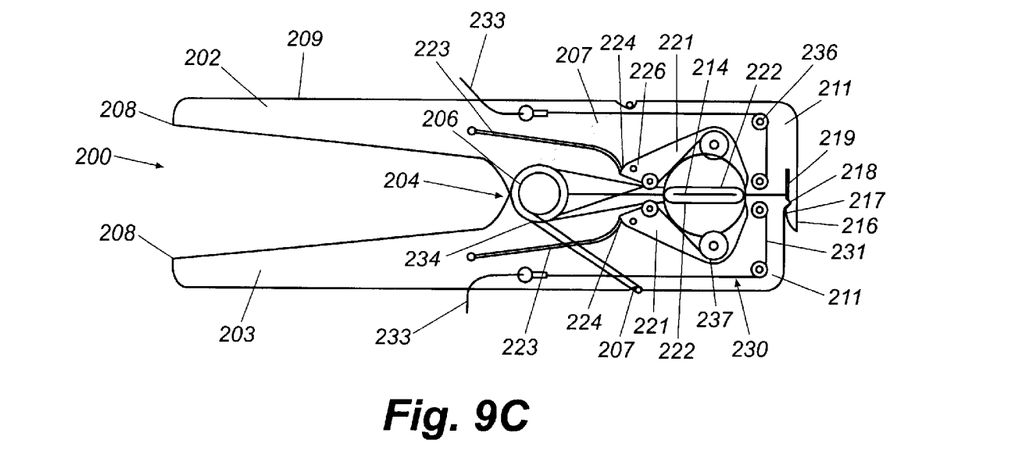

A further additional embodiment of the flow control valve, 200 is illustrated in FIGS. 9A–9C. In this embodiment, the flow control valve 200 has a similar construction to a clamp or pair of pliers. The flow control valve includes a valve body 201 comprised of a pair of pivoting arms 202 and 203. The arms are connected together and pivot about a main spring 204, which includes a central portion 206 and extended portions 207 that bias the arms 202 and 203 toward a normally closed rest position as illustrated in FIG. 9B.

The arms 202 and 203 include first or rear ends 208 that form a gripping area 209, and second or front ends 211 having substantially semicircular recesses or grooves 212 (FIGS. 9A–9B) formed thereat to define a flow passage 213 through the body 201 of the flow control valve 200. As shown at FIGS. 9A–9B, a flexible flow line or flow tube 214 is received and extends through the passage 213 defined in the body 201 when the front ends are in their closed and locked position as shown in FIG. 9B.

A locking clasp or tab 216 is formed at the front end of the upper arm 202, projecting downwardly therefrom. The locking tab includes a sloping surface 217 and a horizontally extending locking surface 218 that engages and bears against a outwardly extending protrusion 219 formed on the front end on the lower arm 203. The engagement of the locking tab with its locking protrusion helps secure the valve in a closed and locked state as illustrated in FIGS. 9B and 9C once the valve has been positioned about a flow tube.

Pinch jaws 221 generally mounted along a side surface of each of the arms 202 and 203 adjacent the passage 213 defined by the recesses 212. Each of the pinch jaws generally is a substantially flat plate pivotally mounted to its respective arm 202 or 203 and including an inwardly facing bearing surface 222 that engages and compresses the flow tube therebetween when the pinch jaws are pivoted to a closed position as illustrated in FIG. 9C. Bias springs 223 are mounted to each of the arms 202 and 203 and connect to one end 224 of each of the pinch jaws so as to bias the ends 224 of the jaws inwardly to cause the pinch jaws to be pivoted about pivot pins 226 and out of engagement with the flow tube to a normally open, unactuated rest position as shown in FIG. 9B.

The flow control valve 200 further includes a valve actuator 230 that generally is a shape memory alloy (SMA) wire 231 connected at its opposite ends to ring connectors 232 that are connected via wires 233 to a power supply (not shown) for supplying the electrical current to the SMA wire. A pulley system 234 is mounted to the arms 202 and 203 of the body 201 and includes a series of pulleys 236 mounted at spaced locations about the arms. The SMA wire is extended in a substantially serpentine path about each of the pulleys 236 and about a pair of additional pulley members 237 that are mounted to the pinch jaws 221.

As an electrical current is applied to the SMA wire, the SMA wire is heated and accordingly contracts by approximately 3% to 7% of its length. As the SMA wire contracts, it exerts a pulling force from the pinch jaws, causing the pinch jaws to be pivoted toward each other so that the flexible flow tube is engaged and compressed between the bearing surfaces of the pinch jaws to constrict the flow of fluid through the flow tube as illustrated in FIG. 9C. Once the electrical current to the SMA wire is discontinued, the SMA wire is permitted to cool and is caused to be stretched back to its original length by the biasing force exerted on the ends 224 of the pinch jaws 221 by the bias springs 223, which cause the pinch jaws to be pivoted away from each other and away from engagement with the flow tube. The amount of current are being passed to the SMA wire further can be controlled as desired as discussed above, to control the amount of contraction and the amount of closure of the pinch jaws for enhanced control of the flow of fluid through the flow tube.

Figure 10:
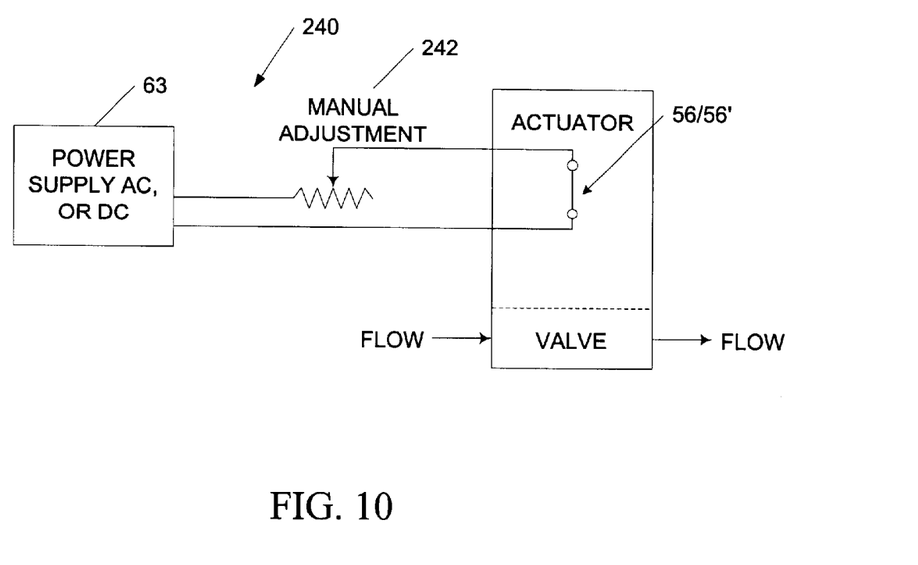
FIG. 10 is a schematic illustration of a manual control system for the proportional flow control valve of the present invention.
Figure 11:
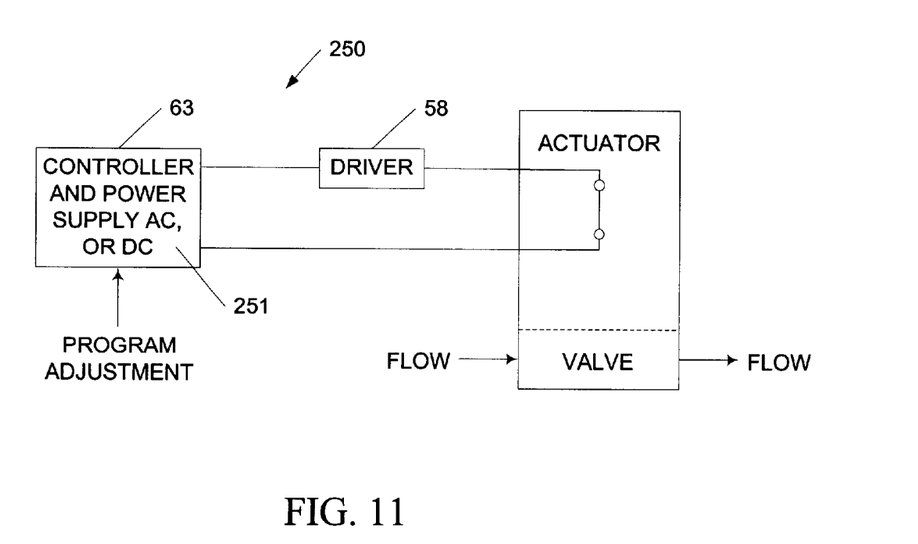
FIG. 11 is a schematic illustration of an open loop control system for the proportional flow control valve of the present invention.
Figure 12A:
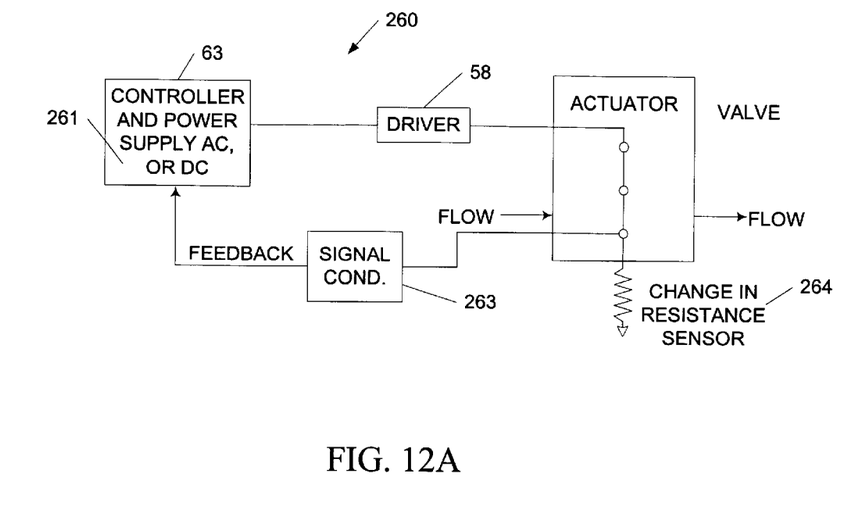
FIGS. 12A–12C are schematic illustrations of closed loop control systems for the proportional flow control valve of the present invention.
Figure 12B:
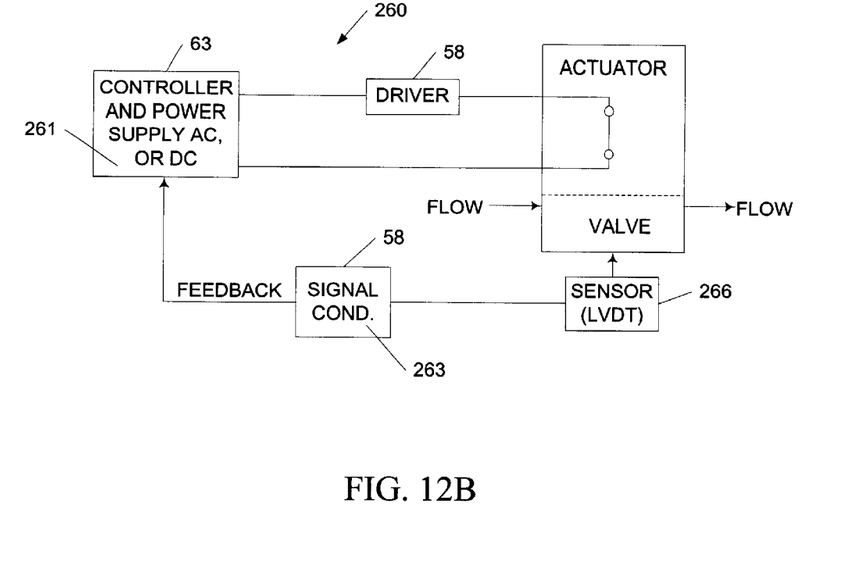
Figure 12C:
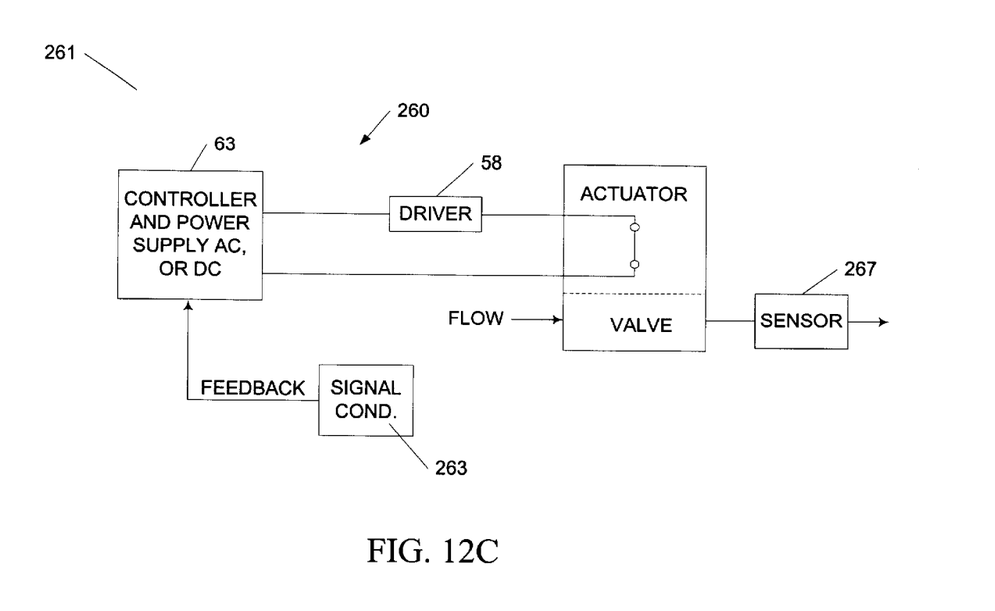

FIGS. 10–12 illustrate various example control systems for controlling the actuation of the SMA wire of the valve actuator for the different embodiments of the flow control valve discussed above. These control systems enable varied types and degrees of control of the actuation of the valves depending upon the application for which these valves are being used.

FIG. 10 generally illustrates a manual control system 240 for the actuation of the flow control valve. In this manual control system 240, the power supply 63 supplies a flow of electrical current to the valve actuator for the valve. As discussed above, as current is applied to the valve actuator, the SMA wire the valve actuator is caused to contract to proportionally open or close the valve as necessary. A manual adjustment mechanism 242, such as a potentiometer, is provided for monitoring the flow of current through the actuator. In response, an operator can make adjustments to the amount of electrical current being applied to the valve actuator for general proportional control of the opening and closing of the flow valve.

FIG. 11 illustrates a first embodiment of a programmed valve control system 250 which includes a programmed controller 251 with the power supply 63 connected thereto. The controller typically is a microprocessor based controller that can be programmed for dynamic or automatic flow adjustment based upon timing or system sequence/events. The controller 251 is connected to driver circuit 58, which is in turn connected to the valve by the plug-in connector, the shape memory alloy or SMA wire of the valve actuator, to control the flow and/or amount of current supplied. In operation, the system controller will control the flow of current through the SMA wire of the valve actuator according to preprogrammed events or timing for proportionally opening or closing the valve to regulate the fluid flow as needed upon occurrence of such preprogrammed events or timing.

FIGS. 12A–12B illustrate still a further embodiment of a valve control system 260, which is a closed loop servo-type control system automatically adjusting the flow through the valve based upon various types of measured feedback from the valve and flow line. The control system 260 includes a system controller 261 connected to the power supply 63 for supplying a flow of electrical current to the SMA wire of the valve actuator of the valve. The controller supplies electrical current to the valve actuator through the driver 58 and receives feedback through a signal conditioning mechanism 263. The feedback provided to the system controller 261 can be a measurement of the internal resistance of the SMA wire, the internal displacement of the pinch jaws themselves based upon the position of the pinch jaws/valve elements of the valve, or through external feedback of the flow fluid itself, i.e., flow rate, pressure, etc.

For example, in a first alternative arrangement for the closed loop control system 260, illustrated in FIG. 12A, a Change-In-Resistance sensor 264 is connected to the SMA wire and measures the internal resistance of the SMA wire as the electric current is applied thereto. In general, as the SMA wire is heated and contracts, its internal resistance decreases. Thus, by monitoring the internal resistance of the SMA wire, the amount of contraction and thus the amount of closure of the pinch jaws of the valve can be determined. The flow of current to the SMA wire therefrom can be controlled through the controller 261 to achieve a desired amount of closure of the valve based upon the resistance feedback measured from the SMA wire.

Alternatively, as shown in FIG. 12B, the feedback to the controller can be provided by an internal position sensor 266 such as a linear variable differential transformer ("LVDT") sensor, a potentiometer, linear transducer or similar sensor that monitors the position of the pinch jaw(s) provide a direct indication as to the amount of opening or closing of the valve based upon the positions of the pinch jaws.

In addition, it is also possible to use an external feedback sensor as shown at 267 in FIG. 12C that is mounted along the fluid flow line itself. Typically, such an external feedback sensor would be either an analog or digital flow-meter or similar sensor that monitors the characteristics of the fluid flow including pressure, temperature, and/or displacement. The sensor provides feedback information as to the characteristics of the fluid flow downstream from the flow control valve through the signal conditioning mechanism 263 to the system controller 261. In response to this feedback information, the system controller can adjust the amount of current being applied to the SMA wire of the valve via the driver circuit 58 to make further proportionally open or close the valve as necessary to achieve the desired flow characteristics, i.e., a desired rate of flow, line pressure, etc.

The present invention thus provides a proportional flow control valve in which the opening and closing of the pinch jaws of the valve is controlled by varying the amount of current applied to an SMA element that functions as a valve actuator to move the pinch jaws between open and closed positions upon application of an electrical current through the SMA element. The amount of current applied can be controlled based upon feedback of either the internal resistance of the SMA element, the position of the pinch jaws, or measurements of the fluid flow itself to enable proportional control of the fluid flow through the valve, while enabling the valve to be simple and cost effective to manufacture and use.

It will be understood by those skilled in the art that while a present invention has been discussed above with reference to preferred embodiments, of various modifications, of variations, additions and substitutions can be made thereto without departing from the spirit and scope of the present invention as set forth in the following claims.

What is claimed is:

1. A pinch valve for proportionally controlling a fluid flow through a flow line, comprising:
    a valve housing defining a passage through which the flow line is received;
    a valve element mounted within said housing with said flow tube extended therebetween, including at least one pinch jaw that is moveable toward and away from an opposed pinch jaw between an open position displaced from said opposed pinch jaw and a closed position wherein the flow line is engaged between said pinch jaw and said opposed pinch jaw to restrict the fluid flow through the flow line; and
    a valve actuator comprised of a shape memory alloy extended about said pinch jaws for applying a force to said pinch jaws to cause at least one pinch jaw to be moved toward said opposed pinch jaw, a series of pulley members mounted within said valve housing and about which said shape memory alloy is extended to enhance said pulling force applied by said shape memory alloy to move said at least one pinch jaw to close the valve and restrict the fluid flow while enabling said shape memory alloy to be of decreased dimensions, and a power source communicating with said shape memory alloy for actuating said shape memory alloy to cause said shape memory alloy to move at least one of said pinch jaws to proportionally control the fluid flow through the flow line as desired.

2. The pinch valve of claim 1 and further including a biasing element for urging said movable pinch jaw toward its open position.

3. The pinch valve of claim 1 and further including a feedback monitoring system for monitoring the amount of opening of the pinch valve and regulating the power supplied to said shape memory alloy for controlling the fluid flow therethrough.

4. The pinch valve of claim 3 and wherein said feedback monitoring system includes a flow-meter for monitoring the flow of fluid through the pinch valve to enable control of the opening of the pinch valve based upon a desired amount of fluid flow through the flow line.

5. The pinch valve of claim 3 and wherein said feedback monitoring system includes monitoring internal resistance of the shape memory alloy as at least one of said pinch jaws is moved toward a closed position to indicate a desired amount of closure of the pinch valve.

6. The pinch valve of claim 1 and wherein said shape memory allow actuator comprises a wire.

7. The pinch valve of claim 1 and wherein said shape memory alloy is formed as a flat strip.

8. The pinch valve of claim 1 and wherein said flow tube is formed from a resilient, flexible material.

9. The pinch valve of claim 1 and wherein said pinch jaws include a stationary jaw and an active pinch jaw that is slidably movable along said valve housing with respect to said stationary jaw upon actuation of said shape memory alloy.

10. The pinch valve of claim 1 and wherein said pinch jaws include a first pinch jaw slidably movable along said valve housing and a second pinch jaw that is removable from said valve housing whereby the valve housing can be opened and mounted at a desired position along the flow line and the second pinch jaw replaced within said valve housing to secure said valve housing on the flow line.

11. The pinch valve of claim 1 and wherein said flow tube includes upstream and downstream ends and fittings at each of said ends for connecting the pinch valve to a fluid line.

12. A valve for controlling a fluid flow through a fluid flow line, comprising:
    a valve housing through which the flow line is extended;
    a valve assembly mounted within said housing and including at least one valve element moveable between a fully open position and a fully closed position for restricting the flow of fluid through the flow line;
    a valve actuator comprising a shape memory alloy of a desired length extended through said housing and about said at least one valve element for applying a force to said valve element to cause said valve element to move between its open and closed positions, a series of pulley members mounted within said housing and about which said shape memory alloy is extended to multiply said force applied by said shape memory alloy to move said at least one valve element so as to enable said shape memory alloy to be of a reduced dimension while providing increased response; and
    a power source for providing a power signal to said shape memory alloy in response to which the length of said shape memory alloy is varied to cause said valve element to be moved between its open and closed positions.

13. The valve of claim 12 and wherein said valve assembly comprises a first pinch jaw and a second pinch jaw, at least said first pinch jaw being moveable toward and away from said second pinch jaw to engage the flow line therebetween to control the fluid flow through the flow line to a desired rate of flow.

14. The valve of claim 13 and further including a flow tube mounted along a portion of the flow line extending through said housing in a position to be engaged by said valve assembly for controlling the fluid flow through the flow line.

* * * * *